United States Patent
Hamada et al.

(10) Patent No.: US 9,201,603 B2
(45) Date of Patent: Dec. 1, 2015

(54) DYNAMIC LOGICAL MAPPING

(75) Inventors: Stephen G. Hamada, Lafayette, CO (US); Brian L. Plomondon, Erie, CO (US); Douglas A. Smith, Louisville, CO (US); Christopher J. West, Erie, CO (US); Michael Silcott, Louisville, CO (US)

(73) Assignee: Oracle America, Inc., Redwood City, CA (US)

( * ) Notice: Subject to any disclaimer, the term of this patent is extended or adjusted under 35 U.S.C. 154(b) by 448 days.

(21) Appl. No.: 11/757,038

(22) Filed: Jun. 1, 2007

(65) Prior Publication Data

US 2008/0301396 A1    Dec. 4, 2008

(51) Int. Cl.
*G06F 12/00*  (2006.01)
*G06F 3/06*   (2006.01)

(52) U.S. Cl.
CPC ............ *G06F 3/0631* (2013.01); *G06F 3/0613* (2013.01); *G06F 3/0686* (2013.01)

(58) Field of Classification Search
USPC ...................................... 711/202, 4; 700/214
See application file for complete search history.

(56) References Cited

U.S. PATENT DOCUMENTS

| | | | |
|---|---|---|---|
| 5,459,848 A * | 10/1995 | Mase | 711/202 |
| 6,480,905 B1 * | 11/2002 | Jesionowski et al. | 710/8 |
| 6,898,480 B2 * | 5/2005 | Goodman et al. | 700/213 |
| 6,912,537 B2 * | 6/2005 | Selkirk et al. | 707/100 |
| 6,950,723 B2 * | 9/2005 | Gallo et al. | 700/214 |
| 6,968,398 B2 * | 11/2005 | Davis et al. | 710/3 |
| 7,046,586 B1 * | 5/2006 | Creager et al. | 369/30.28 |
| 7,251,718 B2 * | 7/2007 | Gallo et al. | 711/202 |
| 7,487,008 B2 * | 2/2009 | Gallo et al. | 700/214 |
| 2005/0071591 A1 * | 3/2005 | Goodman et al. | 711/163 |
| 2005/0267627 A1 * | 12/2005 | Lantry et al. | 700/214 |
| 2006/0004482 A1 * | 1/2006 | Gallo et al. | 700/214 |
| 2006/0020569 A1 * | 1/2006 | Goodman et al. | 707/1 |
| 2006/0069844 A1 * | 3/2006 | Gallo et al. | 711/4 |
| 2007/0022240 A1 * | 1/2007 | Gallo et al. | 711/4 |
| 2008/0120303 A1 * | 5/2008 | Selkirk et al. | 707/10 |
| 2008/0270700 A1 * | 10/2008 | Rao et al. | 711/118 |

* cited by examiner

*Primary Examiner* — Cheng-Yuan Tseng
*Assistant Examiner* — Arvind Talukdar
(74) *Attorney, Agent, or Firm* — Marsh Fischmann & Breyfogle LLP; Robert G. Crouch; Kent A. Lembke (57) ABSTRACT

Dynamic logical mapping ("DLM") provides a virtual layer interposed between a host and a data storage library. Residing on the library, DLM creates a data storage map that records and manages the relationship between a storage cartridge's physical address and that cartridge's mapping to a logical address. During runtime of the data storage library, DLM manages the physical to logical address mapping of each storage cartridge so as to optimize efficiency and speed of the data storage library.

18 Claims, 5 Drawing Sheets

DYNAMIC LOGICAL MAPPING

BACKGROUND OF THE INVENTION

1. Field of the Invention

Embodiments of the present invention relate, in general, to logical mapping in a computer storage library and particularly to dynamic logical mapping of physical elements in a computer storage library.

2. Relevant Background

Logical mapping of data in a computer storage library refers to the process of abstracting logical storage from physical storage. Most Small Computer System Interface ("SCSI") medium changer devices use logical mapping. The logical addresses are the SCSI element addresses. For purposes of the present invention, the terms element address and logical address will be used interchangeably. Furthermore the term library, storage library, tape library and medium changers will also, for the purposes of this invention, be used interchangeably.

Logical mapping of storage helps achieve location independence by abstracting the physical location of the data. Such a system presents to the user a logical space for data storage and itself handles the process of mapping it to the actual physical location.

The actual form of the mapping will depend on the chosen implementation. Some implementations may limit the granularity of the mapping which itself may limit the capabilities of the device. Typical granularities range from a single physical disk down to some small subset (multiples of Mega/Gigabytes) of the physical disk.

Like host-based mapping, several categories of library-based logical mapping exist. While Redundant Array of Inexpensive (or Independent) Drives ("RAID") controllers do provide a logical to physical abstraction, they generally do not provide the benefits of data migration, replication across heterogeneous storage. The exception being a new breed of RAID controllers which do allow the downstream attachment of other storage devices.

Typically, the SCSI categorizes all available slots in a storage library. The four categories are storage, medium transport (a.k.a. robot, hand, or picker), import/export (a.k.a. Cartridge Access Port slot or CAP slot), and data transfer (a.k.a. tape drives). A unique number element address is assigned to each CAP slot.

Physical addresses are unique identifiers for a slot in the library. Many times, the format is chosen to make the physical location of a slot easily identifiable by an operator. In some medium changers, the address mapping is provided by a map, sometimes referred to as a Cell Database ("CellDb"). There is a one to one mapping between physical addresses and logical addresses. Furthermore, a host program is exposed exclusively to logical addressing. A host is a device that sends commands to the SCSI media changer and uses the logical view to access slots in the library. SCSI commands exist so a program can present a physical view of a tape library for a Graphical User Interface ("GUI") application.

Static mapping is the mapping between physical and logical addresses and is initialized during library initialization. Such a logical mapping does not change until a reboot occurs. Another concept well known to those skilled in the relevant art is partitioning. Partitioning presents a single physical tape library to host one or more programs as several smaller libraries. Therefore to a host program, through the use of partitioning, a single library can appear to be several libraries. Resources, such as the CAP, can then be managed using an internal reservation mechanism for sharing among multiple partitions or assigning specific CAP slots to specific partitions.

An operator's (or a host program's) access to a library is limited to the physical slot capacity of the CAP. This limitation leads to an operator or program physically accessing the library to remove a large amount of cartridges. When the library is once again secured (the door is closed), then the entire tape library is audited. This process expends a great deal of time and resources. Cartridges or disks that are frequently accessed, may also be physically distant from the drive. While a host may be aware of the problem and be able to relocate the media, a new mapping is required. Additionally, when physical space is added to a library, the host must reconfigure its view of the library. As a result of these and other scenarios, the library and the host must reboot and statically establish a logical mapping.

SUMMARY OF THE INVENTION

Briefly stated, embodiments of the present invention involve Dynamic Logical Mapping ("DLM") of data storage cartridges within a data storage library. DLM implements a software scheme (module) whereby the logical mapping of physical elements of a data storage library can be changed by the library's system while the system is running. DLM can be used by any device which presents a logical map to a host program. In one embodiment of the present invention, DLM is applied to a data storage (tape) library. While the present invention is described with reference to a data storage library, other types of physical storage media are equally applicable to the present invention and are indeed contemplated as possible additional applications of the invention.

According to one embodiment of the present invention a DLM module is interposed between data storage cartridges housed in cells of a data storage library and one or more hosts. The DLM module creates a map forming a virtual layer between a host and the data storage library storage cartridges. During operation of the library, i.e. during runtime, DLM can modify the physical address to logical address mapping of each cartridge.

According to another embodiment of the present invention, DLM allows an import/export slot (CAP slot) to be virtualized without losing any physical storage slots within the library. Dynamic Logical Mapping allows the internal microcode of the library to remap logical addresses to physical locations during run time. As a result the SCSI medium changer efficiency increases. According to another embodiment of the present invention virtual logical addresses, also referred to herein as virtual slots, are assigned to non-existent physical slots so as to oversubscribe the library's capacity.

According to another embodiment of the present invention the DLM can perform a logical move of a cartridge while the physical address of the cartridge remains unchanged. This virtual moving of cartridges leverages, for example, the concept of having a virtual slot by having a zero slot loss virtual CAP ("VCAP") implementation. VCAPs use several physical storage slots for a particular partition as CAP slots. When the CAP is activated, the cartridges are moved from the VCAP slots to the physical CAP. For imports, however, the contents of the CAP are moved to the VCAP slots.

According to another embodiment of the present invention, the DLM rearranges or shuffles cartridges in the library to maximize the efficiency. A shuffle module manages the physical location of the storage cartridges of a library while maintaining their logical address relationship. Via a command directed by a user, host or by a program running in the background of the library, DLM can rearrange the physical layout of the storage cartridges within a data storage library to promote speed efficiency and other data storage library parameters. According to one aspect of this embodiment, a statistical data mining program collects data regarding data storage use and partitioning and formulates an organizational scheme, within predefined criteria, that would promote overall library performance. While the library remains operational, DLM executes during runtime to move the appropriate cartridges and simultaneously modify the map so as to create a more efficient and optimal physical layout of storage cartridges while presenting to the host a consistent logical address map.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Specific embodiments of the present invention are hereafter described in detail with reference to the accompanying figures. Like elements in the various figures are identified by like reference numerals for consistency. Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention.

According to one embodiment of the present invention, Dynamic Logical Mapping manipulates during run-time the mapping between a logical view and a physical view of data storage slots. This dynamic remapping can occur to fulfill a request by a host program or to fulfill a library internal request by another piece of the firmware. The cell database within which the mapping resides can then be modified to handle the remapping of elements.

One aspect of the present invention includes a virtual layer created within the storage library environment that dynamically virtualizes the storage library. Instead of a host program physically dealing with the library or software managing the physicality of the library based on a static mapping, the host communicates with a fictitious layer that dynamically changes based on the needs of the library and the host. In instances wherein the host may direct or seek a change in the library, a physical alteration of the library can be circumvented by virtue of this intermediate layer between the host and the library. As demands and circumstances change, the virtual layer can be modified to present to the host a new logical mapping of the physical library. Likewise, the physical characteristics of the library, i.e. the location of storage cartridges, can be altered without impacting the host's logical interface. To illustrate the present invention by way of examples, consider the following scenarios.

Figure 1:
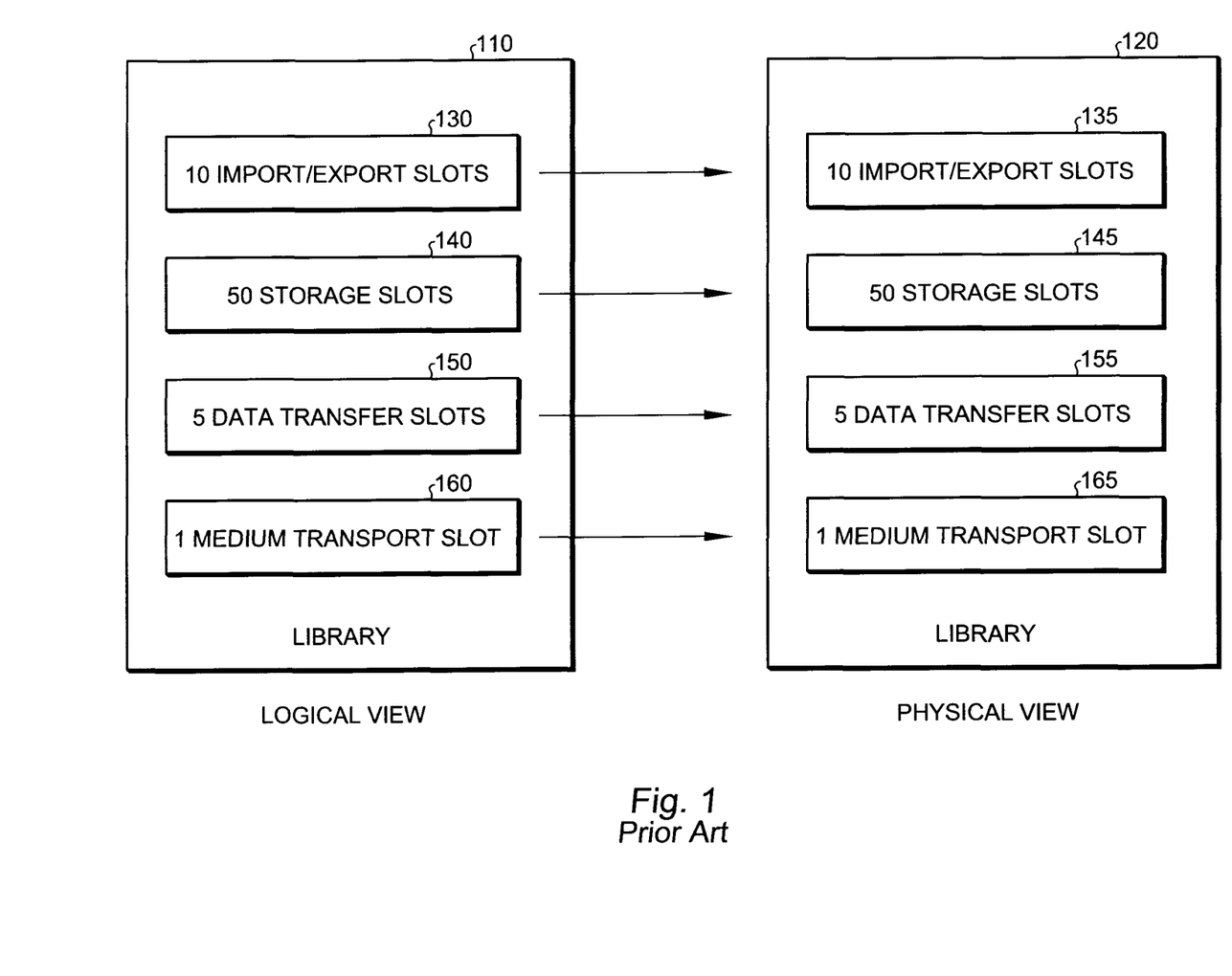
FIG. 1 shows a mapping of a storage library according to a physical view and a logical view, as known in the prior art.

FIG. 1 depicts a logical and physical view of a storage library as known in the prior art. When a library is initialized, a logical view of the library is mapped, on a one to one basis, to the physical view (i.e. the physical location of the storage cartridges within the storage library). As shown in FIG. 1, a logical library 110 maps directly to the physical library 120. The 10 import/export slots ("IE") 130 of the logical library (i.e. the slots used for an import/export port, also known as a Cartridge Access Port) 110 map directly to the 10 IE slots 135 of the physical library 120. Similarly, the logical mapping of the storage slots ("ST") 140 (slots used to store tapes or other storage media), the data transfer slots ("DT") 150 (tape drives), and the medium transport slot ("MT") 160 maps directly to the physical mapping of corresponding storage slots 145, data transfer slots 155, and one medium transfer slot 165. The number of slots for each element type is, as shown in FIG. 1, limited by the number of physical slots available. Once created, this mapping, according to the prior art, is static. Thus without rebooting or reinitializing the library the mapping cannot be altered.

Figure 2:
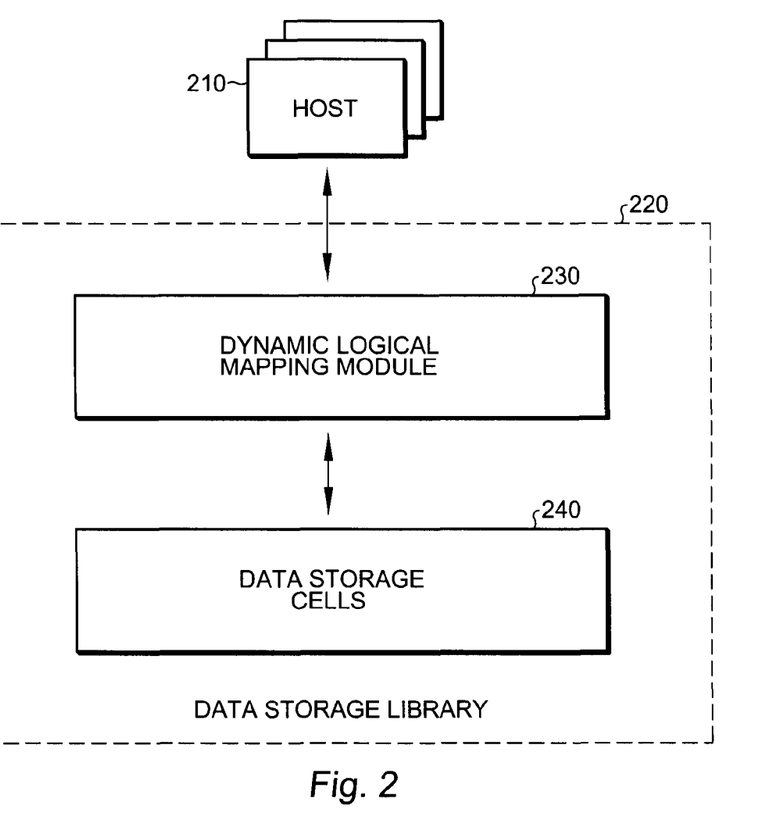
FIG. 2 is a high level block diagram depicting the general architecture of a dynamic logical mapping module with respect to a host and a data storage library according to one embodiment of the present invention.

FIG. 2 shows a high level block diagram depicting, according to one embodiment of the present invention, a general architecture of a host's interaction with a data storage library. One or more hosts 210 interface with a data storage library 220. The interface, as can be appreciated by one skilled in the relevant art, may be via a variety of means including a wired network such as a local area network ("LAN"), a wide area network such as the Internet or in other embodiments a wireless connection. Within the data storage library 220 exists a plurality of data storage cartridges and a DLM module 230. According to one embodiment of the present invention, the DLM module 230 is communicatively interposed between the host(s) 210 and the data storage cartridges 240.

The DLM module acts to manage and manipulate the mapping between the library storage cartridges' 240 physical address and each cartridge's logical address presented to the host 210. Note that the present invention and many of its improvements are described herein with a degree of particularity. It should be understood that this description has been made by way of example.

Figure 3:
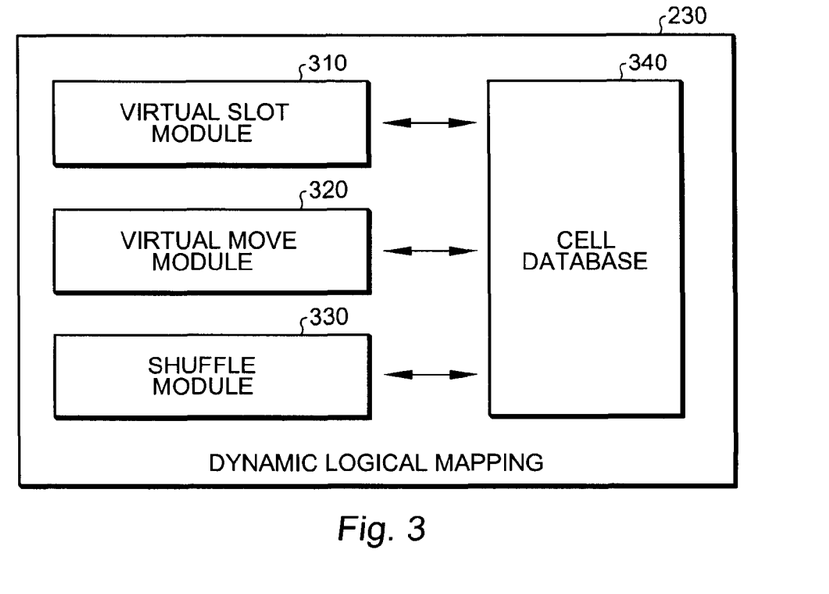
FIG. 3 is a high level block diagram showing, according to one embodiment of the present invention, modules that comprise the dynamic logical mapping module.

With further reference to FIG. 3, a general high level block diagram of the DLM module, according to one embodiment of the present invention, is shown. In this embodiment, the DLM 230 includes three application modules. These application modules include a virtual slot module 310, a virtual move module 320, and a shuffle module 330. Each of these modules interface and interact with a cell database 340 within which resides the mapping of the data storage cartridges' logical to physical address.

Virtual Slot Module

According to one embodiment of the present invention the virtual slot module 310 creates a physical mapping of a logically addressable slot that does not actually exist. Significantly this creation of virtual slots can, according to the present invention, occur dynamically or during run time of the data storage library 220. Assuming that no physical import/export elements and data transfer slots can be populated, a fictitious set of physical addresses can exist creating virtual CAP slots. According to one embodiment of the present invention the library assumes mutually exclusive usage of certain slot types, specifically storage and import/export slots. Note that in a data storage library and for purposes of the present invention, a data storage cell or cartridge occupies a data storage slot. The slot identifies the physical locality of the cartridge. In some instances the term slot (when occupied by a cartridge) is used interchangeably with the term cartridge.

Figure 4:
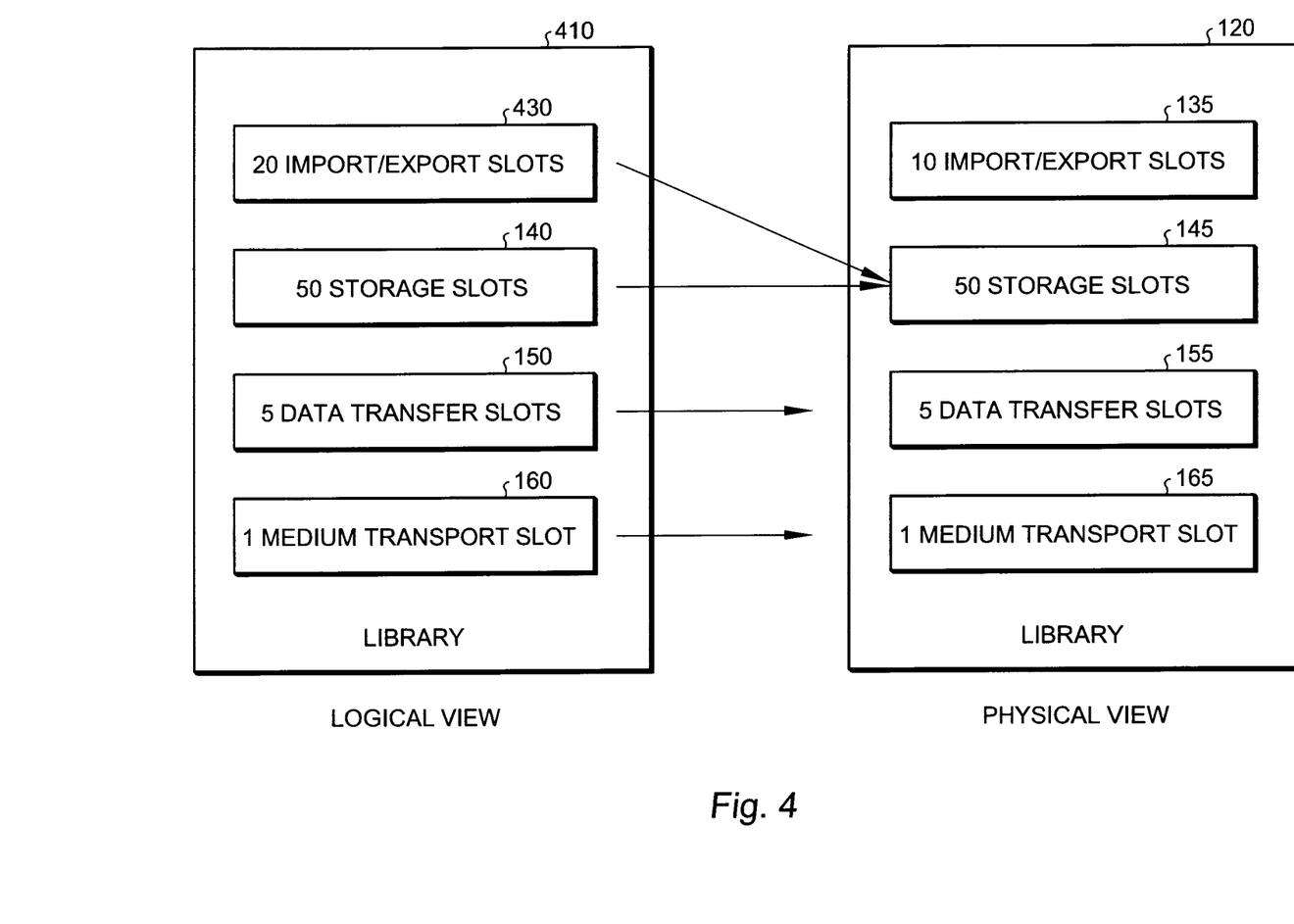
FIG. 4 is a high level block diagram of data storage cartridges in a storage library according to one embodiment of the present invention.

FIG. 4 shows a mapping of a logical view of a storage library to the physical view of a storage library according to one embodiment of the present invention. FIG. 4 demonstrates a zero storage slot loss VCAP. As is shown in FIG. 4, all of the import/export slots 430 of the logical view 410 are mapped to the storage slots 145 of the physical library view 120. Note that the physical library view 120 remains unchanged, i.e. as previously shown and described in FIG. 1. According to one embodiment of the present invention, during initialization of the logical library 410 the logical import/export slots 430 are not mapped to any physical storage slots 145. Rather mapping occurs on a dynamic basis during runtime on an as needed basis when an import/export slot 430 is characterized or mapped to a physical storage slot 145.

As shown in FIG. 4, 10 fictitious or virtual import/export slots are created that are logically addressable but have no physical equivalent. The tape library can therefore assume mutually exclusive usage of the storage and import/export slots. The logical map indicates that there exists within the storage library 70 storage slots whereas in the physical library only 50 slots exist. Typically, a portion of the storage capacity, ST slots, are set aside for use as import/export elements. Therefore if a library possessed 5 import/export elements, 5 ST slots would be set aside just for exclusive use as import/export elements. According to embodiments of the present invention, instead of setting aside storage capacity, the ST slots are virtually remapped according to a library internal, virtual layer, database scheme. Therefore in one instance a particular number of ST slots may be mapped to a similar number of import/export elements. Moments later, when the need no longer exists, those same ST slots can be mapped back to storage slots. This remapping occurs dynamically, during runtime, rather than having to stop and reinitialize the entire library.

To further understand the utility of the present invention consider a plurality of storage slots divided into a particular number of partitions. Assume for purposes of this example that six partitions exist and that this particular library possesses five import/export elements. In such a case, each partition cannot physically be assigned a CAP. Similarly, it may be desirable that for some transactions any one partition may need or can use all five import/export elements. Embodiments of the present invention dynamically shift the allocation of the import/export elements so that from the host's perspective any one partition (or combination of partitions) can use all five (or fewer) import/export elements. Dynamic logical mapping manages the interaction between the host and the library. The host may believe that it has access to any of the six partitions with five import/export elements and that at any time it may use all five import/export elements on any one partition while in reality the physicality of the library makes such an operation impossible. Upon the DLM virtual layer receiving a command to actually move a storage medium such as a cartridge, the DLM, in one embodiment of the present invention, prioritizes which slots are accessed by the limited number of import/export elements.

According to another embodiment of the present invention DLM enables oversubscribing of the CAP to the host. According to one embodiment, the library can, as an example, subscribe to a host six import/export elements when in reality only five exist. Considered another way, six different hosts could be subscribed all of the five physical import/export elements. To accomplish such a mapping in the prior art, the library would be require to possess (allocate) 30 import/export elements to meet such a subscription. Embodiments of the present invention enable the library to oversubscribe the five available import/export elements to each of the hosts. Similarly, hosts, according to another embodiment of the present invention, can be presented a logical capacity of the library that is larger than the library's licensed physical capacity.

Oversubscription presents a larger tape library capacity than is actually present. According to one embodiment of the present invention, the data storage library presents a logical addressing map in excess of the physical slots within the library.

In this example of the present invention, the data storage library has 4 physical ST slots but presents, by virtue of DLM, a 20 ST slot capacity to the host. As the slots are occupied by cartridges, the physical slots (4) will eventually run out. Cartridge imports via the CAP trigger a check of the remaining physically available slots against a predetermined threshold. When the threshold is reached or exceeded, the user is notified that more physical space is needed. The user then adds physical space to the available pool, however, the host's logical view never changes. The user can be notified through various means including but not limited to email, Simple Network Management Protocol ("SNMP"), and vendor unique SCSI error codes. The threshold can be adjusted by the operator based on use needs as well as the logical view of the CAP system. These and other parameters give the user control of when notification occurs.

Consider the previously presented example wherein the threshold is set at 50% capacity (in this case the threshold is 2 cartridges). Only 1 cartridge is present in the library. The operator requests an import operation of 2 additional cartridges. When complete, the threshold (2) is exceeded and the operator is notified using one of the previously identified mechanisms that the existing license has been exceeded. More space is "purchased" from other existing cartridges within the library. The user in this example can buy 4 more ST slots since there was an initial oversubscription, and thus the host program did not need to reconfigure its logical view of the library.

As described above and by virtue of DLM, hosts are presented with a logical capacity that is larger than the licensed physical capacity of the storage library. Rather than requiring the host to reconfigure itself when adding more slots, DLM allows a pool of addresses to be used as long as the number of cartridges does not exceed the number of physical slots licensed for use. When more slots are required by a host, the host can purchase the use of additional slots. Since the pool of addresses is already in use and the library reported the larger pool of addresses originally, no reconfiguration of the host is needed.

Virtual Move

According to yet another embodiment of the present invention a storage medium (cartridge) is virtually moved via a remap of the cell database 340 instead of physically moving the storage cartridge. Traditionally, when a host program requests a move, the firmware processing the request receives the command and the addresses are translated from SCSI element addresses to physical addresses.

Thereafter the cartridge(s) is (are) moved from the existing storage slot(s) to the medium transfer element (a.k.a. robot, hand, or picker), and physically moved from the medium transfer element to the new destination slot. In such a scenario, there is a one to one correspondence between the physical address changes for the cartridge and the logical address changes in the cell database.

According to concepts known to one skilled in the art, a library contains only one type of physical element slot types that cannot change their logical addresses. Those physical elements are the data transfer elements (tape drives). This is because host programs traditionally track the drive type and identifier (world wide name or serial number) to a specific logical address.

According to one embodiment of the present invention, the virtual move module 320 of the DLM 230 can dynamically and virtually move one or more cartridges, from the perspective of the host, from one location to another, without, from the library's perspective, executing a physical transfer of the cartridge(s). According to one exemplary embodiment of the present invention, firmware or a machine capable of executing computer executable code within the data storage library 220 receives a command to move a cartridge. The logical addresses stored in the cell database 340, identifying the source location of the cartridge and the destination location of the cartridge, are translated from SCSI element addresses to physical addresses.

The library cell database is thereafter changed so that the source physical address is mapped to the destination element address and the destination physical address is remapped to the source element address. Said another way, the logical mapping of the physical addresses are modified dynamically. This completes the move.

Physically, the cartridge never leaves its original physical slot, however, from the perspective of the host program, the move actually takes place. Internally, the move is accomplished virtually using DLM. DLM can perform moves of this type repeatedly as new requirements are presented to the library from the host(s). The library and the mapping are modified dynamically rather than statically.

Figure 5:
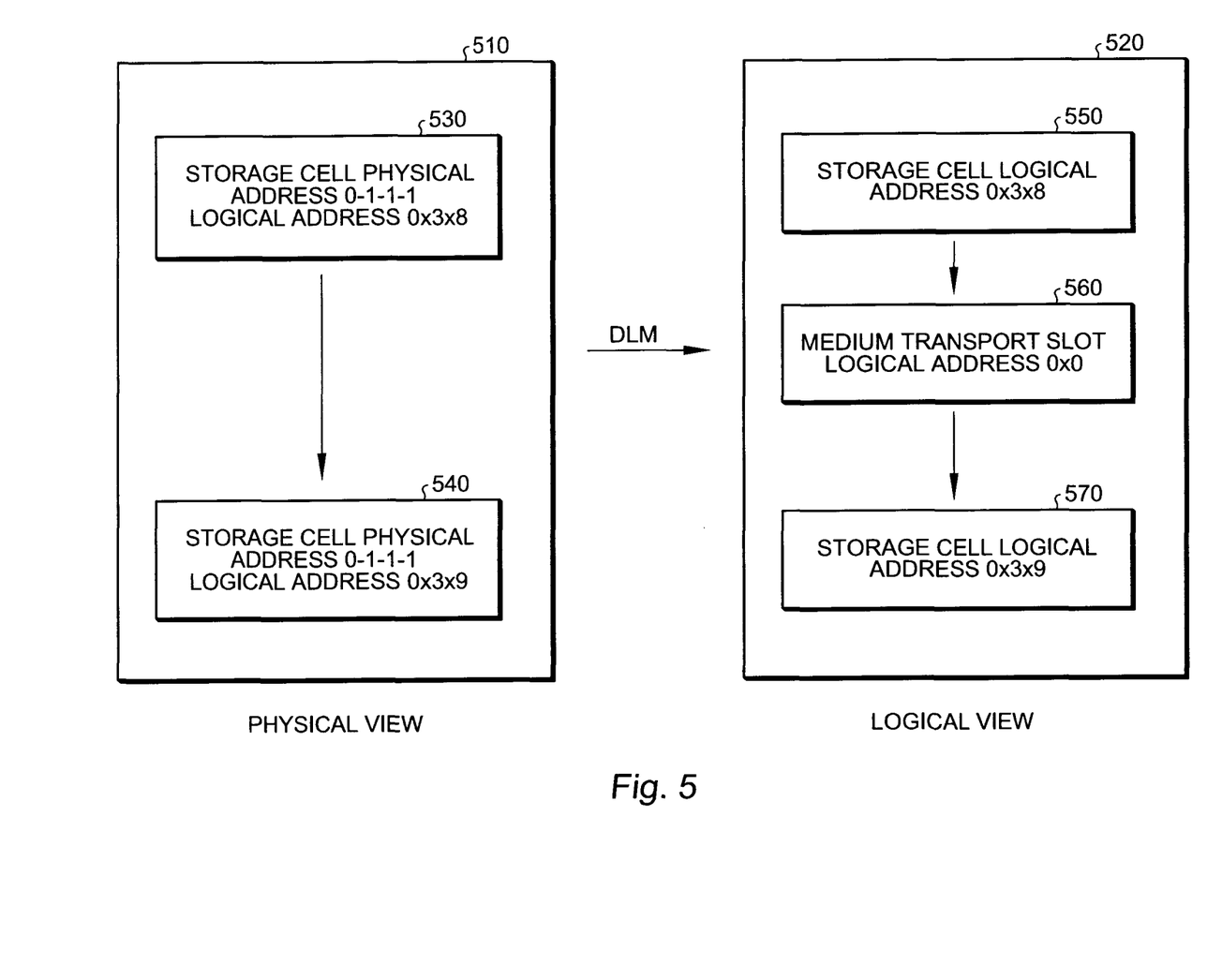
FIG. 5 is a high level block diagram showing a virtual move according to one embodiment of the present invention from the perspective of a physical view and a logical view of the same storage cartridge.

FIG. 5 depicts a side by side representation of the logical view, as seen by a host, and the physical view of moving data cartridges in a library, according to one embodiment of the present invention. According to the prior art, moving one storage cartridge from one location to another would involve the intermediary use of a medium transport slot. For example consider a storage cartridge having a physical address of 0-1-1-1 (library-module-row-column) and a logical address of 0x3e8. A command is received to move the cartridge from its present location to a physical address of 0-1-1-2. To accomplish such a move the cartridge would be transported from the original address 0-1-1-1 to a medium transfer slot having an address of 0-0-0-0 and a logical address of 0x0 and thereafter to its final destination of 0-1-1-2 having a new logical address of 0x3e9. Thus from the logical perspective, the logical address of the storage cartridge is altered from 0x3e8 to 0x0 to 0x3e9.

As shown in FIG. 5, DLM enables the logical mapping of a cartridge to be modified during runtime while the physical location remains unaltered. Depicted in FIG. 5 are the physical and logical views of a storage cartridge. Upon the receipt of a command to move a storage cartridge, DLM modifies the logical view without altering the cartridge's physical location. As shown in the cartridge's physical view 510 the cartridge's original physical address is 0-1-1-1 which corresponds to a logical address of 0x3e8. This relationship is stored in the cartridge database.

Similarly, from the logical view's perspective 520, the cartridge's logical address is 0x3e8. According to one embodiment of the present invention, despite a command to relocate the cartridge, the DLM simply modifies the cell database so as to change, for this cartridge, the relationship between the cartridge's physical address, 0-1-1-1 and its new logical address, 0x3e9 as shown in the lower block 540 of the physical view.

From the logical view's perspective however, the cartridge is actually moved. As far as a host is concerned the cartridge moved from it original logical address of 0x3e8 550 to an intermediate logical address of 0x0 in the medium transport slot 560, to its final logical address 570 of 0x3e9. Physically, the cartridge never moved from its original address, however from the host's perspective, the cartridge has been relocated. This virtual move is accomplished by DLM and increases the speed of the move and efficiency of library operations.

Shuffle

According to another embodiment of the present invention, cartridges within a storage library can be repositioned during runtime to optimize library efficiency. The moving of cartridges or operators entering cartridges in a random fashion by one or more host programs can result in the cartridges not being optimally organized. Host programs may not have the ability to detect such a condition and/or correct it.

According to one embodiment of the present invention, DLM maximizes library utility by modifying cartridge layout in the physical slots of the library without impacting the interface between the library and the host. Significantly, the utility of the organization of the library may vary from one operator to another, from one task to another, and from one host to another. Previously, to optimize the physical layout of the cartridges within the library would require a reboot and a static logical mapping. Such a transaction would be time consuming and likely defeat the savings of the reorganization since the optimal reorganization for one task, host or operator would be likely different from another. Embodiments of the present invention enable a library to dynamically reconfigure itself based on the needs of the operator, host, or task. In one embodiment of the present invention the configuration of frequently used cartridges can be altered such that access speed to these cartridges is maximized. In another embodiment of this aspect of the present invention the library's physical organization can be manipulated to facilitate maximizing the ability for an operator to locate cartridges in a partition. Embodiments of the present invention reorganize cartridges within the data storage library based on the type of efficiency desired.

According to one embodiment of the present invention, DLM configures the library based on input(s) from an operator. In other embodiments, pre-establish criteria or a periodic optimization based on historical data can trigger the DLM to reconfigure the library. In yet another embodiment of the present invention, DLM monitors the interaction between the hosts and the cartridges within the data storage library and periodically, based on characteristics developed from these collected transactions, reorganizes the physical location of the cartridges within the library so as to promote efficiency. Significantly, the DLM module 230 modifies the cell database 340 dynamically (i.e. during runtime) as these physical relocations take place. Therefore to the host or operator interacting with the library, the relocation of cartridges is transparent. From the host's perspective, the logical address of the cartridge remains unchanged yet the DLM dynamically modifies the relationship, or mapping, between the cartridges' physical address and the cartridges' logical address.

In one example of the present invention an operator interfaces with DLM to configure the library. The operator inputs the type or goal of the optimization and when it should be executed. Other parameters as can be appreciated by one skilled in the relevant art can also be the basis and focus of this optimization/reconfiguration. Data and statistics are mined from the tape library so that DLM can make an intelligent decision as to what cartridges need to be moved. DLM sends move commands, either under the supervision of an operator or autonomously, to the tape library to place cartridges in their optimum location within the library. Normally a drawback of such a scheme would be that the logical addresses of every repositioned cartridge locations would change. This would be unacceptable to host software thus necessitating a rebooting and a new mapping of the physical addresses to logical addresses. The DLM enables the logical mapping from the host's perspective to remain constant while the physical configuration of the library is adjusted so as to be optimized.

As can be appreciated by one skilled in the relevant art, the arrangement of cartridges in a tape library can be, and is typically, purely random. Embodiments of the present invention remove this randomness to enhance efficiency and decrease access latency. A library configured in such a random method can be thought of as the equivalent of memory fragmentation in a storage disk. De-fragmentation routines with regard to data stored on a disk move and reorganize data within that disk based on a number of parameters including frequency of access and the role a particular piece of data occupies with respect to the operation of the host computer. With respect to a data storage library, a host program can optimize cartridge locations while using new pages for a Log Sense or Mode Sense command to detail the physical to logical address mapping. It is well known in the art that a host program could then make intelligent decisions on where to relocate cartridges within a library. However such a move is based on the perspective of a single host and may not be in the best interest of the data storage library. Furthermore, the presence of a virtual layer between the host and the storage cartridges may preclude such a move. By placing the ability to dynamically relocate cartridges within the library realm the efficiency of storing and retrieving data stored within the data storage library is significantly enhanced.

According to embodiments of the present invention, DLM can optimize the physical location of the cartridges within the library during the library's initialization, during runtime and while the library is in an operational mode, and on demand based on an operators need to optimize library configuration to implement a particular task at, perhaps, the trade off of decreasing efficiency of accomplishing other non-related tasks. Furthermore, in yet another embodiment of the present invention, the ability of DLM to relocate or shuffle cartridges within the library can be deactivated because of hardware or user selected limitations.

According to one embodiment of the present invention the code responsible for optimizing the physical layout of cartridges within the library can be resident on the main controller card of the library, however, in other embodiments it may reside on an expansion board. One such expansion board could be the blade card. In such an implementation the blade card provides an Ethernet port which could be used for a management interface. This interface can be used to select and configure efficiency parameters. A user can also specify whether cartridge relocation should be executed. The interface can then be used to convey the physical address to the DLM to modify logical address mapping within the cell database.

During initialization, cartridge relocation would use configuration and efficiency parameters from an external interface, and the data and statistics from the data storage library to determine the optimal cartridge layout. It can also install an efficiency module used by the relocation run-time optimization component to determine where to place a cartridge.

These and other implementation methodologies for DLM can be successfully utilized by the data storage library. These implementation methodologies are known within the art and the specifics of their application within the context of the present invention will be readily apparent to one of ordinary skill in the relevant art in light of this specification.

It is noteworthy to recognize that the optimization is dynamic in nature. While the library continues to operate, the configuration of the cartridge within the library may be optimized numerous times based on varying criteria. This criteria may be access speed, drive types, elevator operations, user preference and the like.

Figure 6:
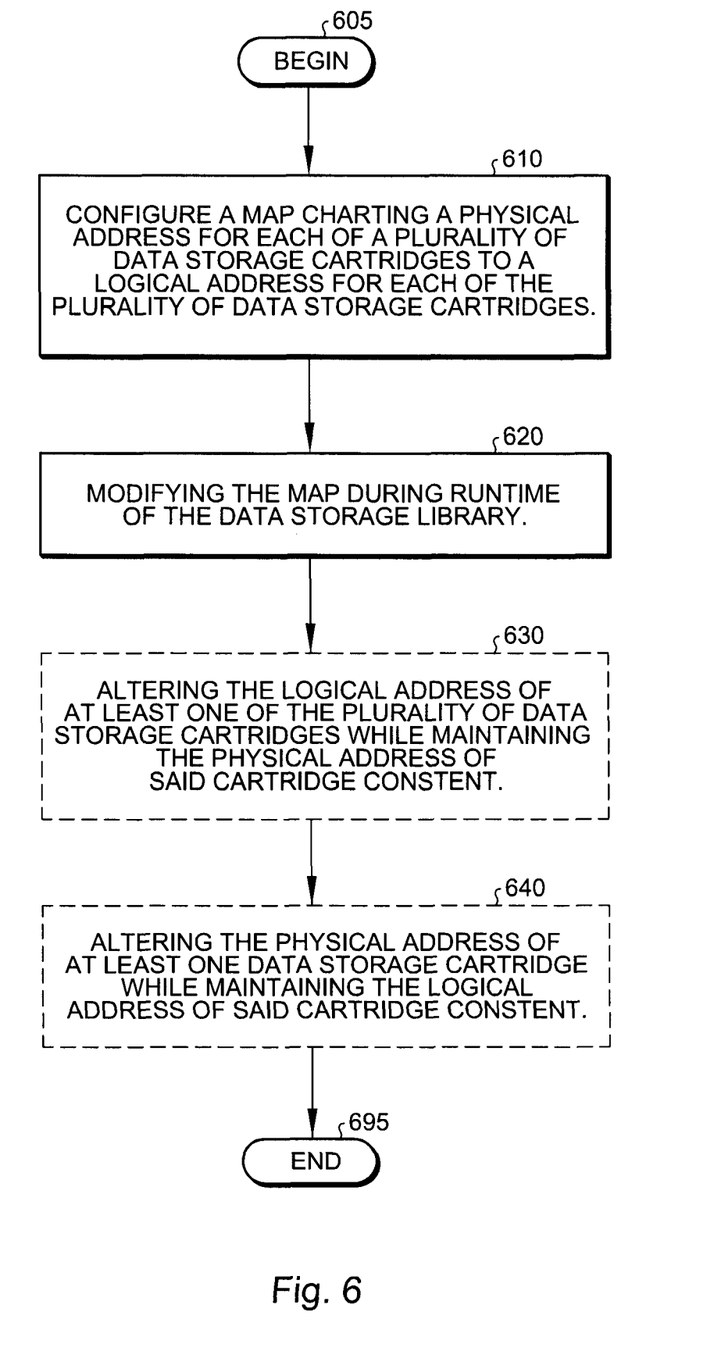
FIG. 6 is a flowchart of one method embodiment for modifying a physical-to-logical mapping of data storage cartridges in a data storage library according to the present invention.

FIG. 6 is a flowchart of one method embodiment for modifying a physical-to-logical mapping of data storage cartridges in a data storage library according to the present invention. As shown, the process begins 605 with the configuration of a map 610 charting a relationship between a physical address for each cartridge within a storage data library and that cartridge's corresponding logical address. Once configured, the map can thereafter be modified 620 during runtime of the data storage library.

In other embodiments of the present invention the logical address of one or more cartridges can be altered 630 while keeping the physical address of those cartridges constant. Similarly and in another embodiment of the present invention, the physical addresses of one or more cartridges, and indeed the actual physical location of those cartridges, can be altered 640, while the logical address of those altered cartridges remains constant. These, and as described above, other embodiments of the present invention can be implemented by DLM.

As described, FIG. 6 is a flowchart illustrating methods of implementing an exemplary process for dynamic logical mapping. It will be understood that each block of the flowchart illustrations, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block or blocks. The computer program instructions may also be loaded onto a computer or other programmable apparatus to cause a series of operational steps to be performed in the computer or on other programmable apparatus to produce a computer implemented process such that the instructions which execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems which perform the specified functions or steps, or combinations of special purpose hardware and computer instructions.

Dynamic Logical Mapping provides simplicity and efficiency for managing data storage libraries. When combined with new and existing concepts, DLM provides a powerful set of benefits.

While the invention has been particularly shown and described with reference to a preferred embodiment thereof, it will be understood by those skilled in the art that various other changes in the form and details may be made without departing from the spirit and scope of the invention.

As will be understood by those familiar with the art, the invention may be embodied in other specific forms without departing from the spirit or essential characteristics thereof. Likewise, the particular naming and division of the modules, managers, functions, systems, engines, layers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, functions, systems, engines, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

We claim:

1. A computer system for dynamic logical mapping between a host and a plurality of storage media of a data storage library, the system comprising:
   a dynamic logical mapping ("DLM") module communicatively interposed between the host and the data storage library wherein the DLM module includes a map, wherein said map charts a physical address portion, said physical address portion having a physical address for each storage media within the data storage library, to a logical address portion, said logical address portion having a logical address for each storage media recognized by the host; and
   wherein the map is modified while the data storage library and DLM module are operating, such that at least a portion of said plurality of storage media is physically relocated within said data storage library such that said physical address portion is modified from a first physical address to a second physical address while said logical address portion is unchanged, and wherein said first physical address corresponds with a first physical storage location existing in said data storage library prior to the creation of said map and said second physical address corresponds with a second physical storage location existing in said data storage library prior to the creation of said map, and wherein said portion of said plurality of storage media are addressable by the host, via the DLM module, both before the physical relocation and after the physical relocation; and
   wherein the DLM module provides one or more virtual slots that include one or more logical addresses addressable by the host that have not been mapped to a physical address, so that the host is presented with more logical addresses than there are available physical addresses, wherein when the host requests one of the virtual slots, the DLM modifies the map while the data storage library and DLM module are operating, to add a logical connection such that the map charts a physical address of a storage media to the virtual slot.

2. The system of claim 1 wherein the DLM module alters the logical address of at least one of the storage media independent of the physical address of the storage media.

3. The system of claim 1 further comprising a subset of the plurality of storage media that are dynamically mapped to a plurality import/export elements.

4. The system of claim 3 wherein dynamic mapping of the subset of the plurality of storage media to the plurality of import/export elements is modifiable during runtime.

5. The system of claim 4 wherein the subset of the plurality of storage media slots mapped as import/export elements remain available to the data storage library when the CAP is not accessed by the host.

6. The system of claim 3 further comprising a first number representing the subset of the plurality of storage media mapped to a plurality of import/export elements exceeds a second number representing the plurality of import/export elements creating virtual import/export elements that are modifiable during run time.

7. The system of claim 1 wherein the DLM module physically relocates storage media in the data storage library and correspondingly modifies, during runtime, the physical address portion of the cartridge data as directed by the host to increase data storage library efficiency.

8. The system of claim 1 wherein the DLM module physically relocates storage media in the data storage library based on statistical information gained during runtime to optimize storage media location reduce physical transport time associated with physically retrieving said storage media, and wherein said relocation is transparent to the host.

9. The system of claim 1 wherein the DLM module physically relocates storage media in the data storage library based on an independent command by a user to modify storage media configuration and wherein said relocation is transparent to the host.

10. The system of claim 1 wherein the DLM module physically relocates storage media in the data storage library based on data storage library characteristics including drive types within the data storage library and wherein said relocation is transparent to the host.

11. A method implemented by a computer for dynamic logical mapping of a plurality of data storage media cartridges of a data storage library, said method comprising:
configuring a map wherein said map charts a physical address for each of the plurality of data storage media cartridges to a logical address for each of the plurality of data storage media cartridges, said logical address useable by a host;
modifying the map's charting of the physical addresses of at least a portion of the plurality of data storage media cartridges of the map while the data storage library and the host are operating, such that the modifying is transparent to the host, wherein each said physical address modified is changed from a first physical address to a second physical address while said logical address portion is unchanged, and wherein said first physical address corresponds with a first physical storage location existing in said data storage library prior to the creation of said map and said second physical address corresponds with a second physical storage location existing in said data storage library prior to the creation of said map, and wherein said portion of said plurality of storage media are addressable by the host both before the modifying and after the modifying; and
providing to the host one or more virtual slots that include one or more logical addresses addressable by the host that have not been mapped to a physical address, so that the host is presented with more logical addresses than there are available physical addresses, wherein when the host requests one of the virtual slots, the map is modified while the data storage library and the host are operating, to add a logical connection such that the map charts a physical address of a storage media to the virtual slot.

12. The computer implemented method of claim 11 wherein modifying includes altering the logical address of at least one of the plurality of data storage media cartridges.

13. The computer implemented method of claim 11 wherein the map includes a subset of logical addresses of the plurality of data storage media cartridges designated as storage cartridges, represented by a first number, mapped to a plurality of physical addresses associated with cartridge access ports represented by a second number, and wherein modifying includes altering the map such that the first number is greater than the second number.

14. The method of claim 11 wherein modifying includes altering the physical address of at least one of the plurality of data storage media cartridges of the map based on data storage library characteristics including read/write drive types used to access the data storage media cartridges.

15. The method of claim 11 wherein modifying includes:
gathering during computer runtime statistical data regarding data storage library performance;
analyzing gathered statistical data with respect to data storage media cartridge configuration;
altering, during computer runtime, data storage library configuration by changing location of at least one data storage media cartridge and its physical address in the map based on the analysis of the gathered statistical data while keeping the logical address of the at least one data storage media cartridge constant to reduce physical transport time of said data storage media cartridges within said data storage library; and
wherein said statistical data includes data regarding data storage media cartridge access frequency and data types stored on said data storage media cartridge.

16. The method of claim 15 wherein modifying includes altering the physical address of the cartridge based on a command from the host.

17. A system for dynamic logical mapping, said system comprising:
a data storage library;
a plurality of data storage cartridges comprising said data storage library and configured to store data, wherein each data storage cartridge possesses a physical address;
a host, wherein the host accesses the data storage library to store and retrieve data using a logical address for each data storage cartridge; and
a dynamic logical mapping ("DLM") module interposed between the host and the data storage library, said DLM module executed by a computer residing in the data storage library, wherein the DLM module creates a map mapping the logical address of each data storage cartridge to the physical address of each data storage cartridge, and wherein the map is modified while the data storage library and DLM module are operating, at the computer to increase the efficiency of the data storage library by modifying said physical address of at least one data storage cartridge from a first physical address to a second physical address while said logical address portion is unchanged, and wherein said first physical address corresponds with a first physical storage location existing in said data storage library prior to the creation of said map and said second physical address corresponds with a second physical storage location existing in said data storage library prior to the creation of said map, and wherein said portion of said plurality of storage media are addressable by the host, via the DLM module, both before the modification of said map and after the modification of said map; and
wherein the DLM module provides one or more virtual slots that include one or more logical addresses addressable by the host that have not been mapped to a physical address, so that the host is presented with more logical addresses than there are available physical addresses, wherein when the host requests one of the virtual slots, the DLM modifies the map while the data storage library and DLM module are operating, to add a logical connection such that the map charts a physical address of a storage media to the virtual slot.

18. The system of claim 17 wherein the physical address of at least one of the plurality of data storage cartridges is modified during runtime of the computer to decrease access latency while the logical address of the at least one of the plurality of data storage cartridges remain unchanged.

* * * * *

UNITED STATES PATENT AND TRADEMARK OFFICE
CERTIFICATE OF CORRECTION

PATENT NO. : 9,201,603 B2  
APPLICATION NO. : 11/757038  
DATED : December 1, 2015  
INVENTOR(S) : Hamada et al.

Page 1 of 1

It is certified that error appears in the above-identified patent and that said Letters Patent is hereby corrected as shown below:

In the drawings,

On sheet 5 of 5, in Fig. 6, under reference numeral 630, line 5, delete "CONSTENT." and insert -- CONSTANT. --, therefor.

On sheet 5 of 5, in Fig. 6, under reference numeral 640, line 4, delete "CONSTENT." and insert -- CONSTANT. --, therefor.

In the specification,

In column 3, line 39, delete "invention:" and insert -- invention; --, therefor.

Signed and Sealed this  
Twenty-third Day of August, 2016

Michelle K. Lee  
*Director of the United States Patent and Trademark Office*